United States Patent [19]
Fontana et al.

[11] 3,856,760

[45] Dec. 24, 1974

[54] METHOD OF COPOLYMERIZING UNHINDERED CONJUGATED DIENES WITH MALEIC ANHYDRIDES

[76] Inventors: C. Michael Fontana, Rt. 2, Washington, W. Va. 26181; Byran Sparks, 860 Sinclair Dr., Baton Rouge, La. 70815

[22] Filed: Oct. 24, 1972

[21] Appl. No.: 299,985

Related U.S. Application Data

[63] Continuation of Ser. No. 79,275, Oct. 8, 1970, abandoned, which is a continuation-in-part of Ser. No. 36,497, May 11, 1970, abandoned, which is a continuation-in-part of Ser. No. 724,590, April 26, 1968, abandoned.

[52] U.S. Cl. .................................... 260/78.5 BB
[51] Int. Cl. .................................... C08f 15/02
[58] Field of Search ................ 260/78.5 R, 78.5 BB

[56] References Cited
UNITED STATES PATENTS

| | | | |
|---|---|---|---|
| 3,414,547 | 12/1968 | Thomson | 260/78.5 |
| 3,491,068 | 1/1970 | Gaylord | 260/78.5 |

*Primary Examiner*—Joseph L. Schofer
*Assistant Examiner*—John Kight, III
*Attorney, Agent, or Firm*—Donald W. Banner

[57] ABSTRACT

A method of producing high yields of gel-free copolymers of maleic anhydride and unhindered conjugated dienes comprising the step of reacting the conjugated diene and maleic anhydride in a batch reactor containing a solvent and a sparingly soluble free radical-generating catalyst.

1 Claim, No Drawings

METHOD OF COPOLYMERIZING UNHINDERED CONJUGATED DIENES WITH MALEIC ANHYDRIDES

CROSS REFERENCE TO PRIOR APPLICATIONS

This application is a continuation of Application Ser. No. 79,275, filed, Oct. 8, 1970, now abandoned, which was a continuation-in-part of Application Ser. No. 36,497, filed May 11, 1970, now abandoned, which was a Continuation-in- part of Application Ser. No. 724,590, filed Apr. 26, 1968, now abandoned.

BACKGROUND

The preparation of maleic anhydride-conjugated diene copolymers has been accomplished prior to this invention. One such preparation is set forth in U.S. Pat. No. 2,967,174, issued Jan. 3, 1961, to Bartl and assigned to Farbenfabriken Bayer. More specifically, the preparation of a conjugated diene-maleic anhydride copolymer is set forth in Example 6 of this patent wherein a catalyst and a diene are added to a reaction mixture containing maleic anhydride and a solvent. The polymerization is started in this reaction by adding an increment of the catalyst initially along with a second component, namely, a monoolefinic compound such as styrene or vinyl ester. The rate of addition of the conjugated diolefinic compound controls the rate of polymerization as well as the temperature of the reaction. Because of the presence of a competing side reaction, the Diels-Alder synthesis, it was taught that the catalyst must be present at all times in the reaction to obtain a copolymer.

Another preparation of a diene copolymer is set forth in British Pat. No. 561,645, issued May 30, 1944, to Standard Oil Development Company. In this patent the reaction of piperylene with maleic anhydride is described and a 10–15 percent yield of acidic polymerization product, of high molecular weight, is the end result of the reaction.

The yield of polymer was not reported in Example 6 of the Bartl patent.

SUMMARY OF THE INVENTION

Briefly described, this invention is a method of copolymerizing unhindered conjugated dienes with maleic anhydride through addition of diene monomer to a solvent medium containing maleic anhydride and saturated with a free radical catalyst. The method of this invention provides a steady state catalyst concentration in the copolymerization reaction because the reaction medium is saturated or nearly saturated with an excess of an active, sparingly soluble, free-radical-generating catalyst which is thermally stable in the solid state at the temperature of polymerization. In a specific embodiment of the invention the catalyst-accelerator combination is ammonium peroxydisulfate-sodium bisulfite with acetone utilized as the solvent.

The method of this invention makes it practical to prepare copolymers of unhindered conjugated dienes with the maleic anhydride where the yield of copolymers exceed 50 percent. The process of the instant invention utililizes economical, free radical generating catalysts which makes the method a highly desirable and commercially feasible method of preparing polymer. A requirement of the catalyst is that it be sufficiently soluble in the reaction mixture and sufficiently reactive to produce free radicals at the required rate. A catalyst that is too soluble makes it impractical to operate at saturation with respect to catalyst. The amount of catalyst employed need not be critically controlled as long as a sufficient amount is present to maintain the solution saturated or nearly so.

The unhindered conjugated dienes that may be copolymerized in accordance with the method of this invention are of the formula.

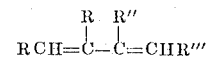

wherein R, R' and R'' and R''' are selected from the group consisting of hydrogen, halogen, alkyl, and alkoxy radicals having one to eight carbon atoms and aryl radicals containing six to ten carbon atoms.

Unhindered conjugated dienes that may be utilized include butadiene, isoprene, substituted butadienes such as 2-chloro-1,3-butadiene; 2,3-diclorobutadiene; piperylene; 2,4-hexadiene; 2,3-dimethylbutadiene; 2-ethyl-1,3-butadiene; 2-propyl-1,3-butadiene; 2-phenyl-1,3-butadiene; 1-methoxy-1,3-butadiene and the like.

In general, the molar ratio of the conjugated diene to maleic anhydride is varied between about 1.2:1 to 1:1 since it has been determined that the copolymers contain conjugated diene and maleic anhydride in a nearly 1:1 to 1.1:1 molar ratio upon completion of the polymerization reaction.

Acetone is utilized to illustrate the invention, other suitable solvents include ketones; esters, ethers, e.g., methyl ethyl ketone, cyclochexanone, ethyl acetate, butyl acetate, dioxane, tetrahydrofuran, dipropyl ether, dibutyl ether, dimethyl ether of ethylene glycol or dimethyl ether of diethylene glycol and the like, including mixtures thereof. The more polar solvents are generally preferred due to their tendency to serve as solvents for both monomers and copolymers formed. Certain polar solvents such as water, alcohols, and amines should not be used as these will react with the anhydride.

The amount of solvent used in the reaction is not critical as long as the amount is sufficient to maintain a low viscosity throughout the reaction for adequate mixing and heat transfer and is sufficient to prevent gel formation. The amount required to prevent gel formation will depend on other reaction conditions such as temperature, residence time in the reactor, catalyst concentration, activity, etc. An operable ratio of solvent to reactants may be from 1:2 to 5:1 (by weight). In given circumstances, it may be necessary to increase the amount of solvent to prevent gel formation.

For purposes of comparison and to illustrate the invention, certain polymerization reactions were conducted using various catalyst-accelerator combinations.

A laboratory apparatus was provided, consisting of a reactor equipped with stirrer, gas inlet, heater, thermometer and reflux condenser cooled by acetone circulation through a cold dry ice-acetone bath. Maleic anhydride (98g, 1 mole), acetone solvent (152g.) and the indicated amount of accelerator were placed in the reactor and the mixture was stirred and heated to reaction temperature. The catalyst was added immediately prior to the start of the butadiene addition (52g., 1 mole) which was added over the indicated time period. The polymeric product was isolated by precipitation of the reaction mixture in benzene (2 liters). The other conditions of the experiments and results are given in Table 1 hereinbelow. The low yields shown in Table 1 are typical of the numerous experiments carried out with many conventional and non-conventional catalyst-accelerator systems. In the following Examples 1–8 inclusive:

It has been discovered that to maximize yield and yet preserve desirable polymer properties such as molecular weight, etc., one must maintain a constant and a high rate of generation of free radicals throughout the time of reaction. This can be achieved by operating in

TABLE 1

| Ex. No. | Catalyst | Accelerator | Amoung/g | | Reaction Conditions | | | | Polymeric Product |
|---|---|---|---|---|---|---|---|---|---|
| | | | Cat[1] | Acc[2] | Temp(°C) | | Time(Min) | | % Yield |
| | | | | | Range | Ave[3] | BD Add | Total [4] Reaction | |
| 1 | Methyl ethyl ketone peroxide | Cobalt naphthenate | 3.04 | 1.76 | 20–30 | 25 | 5 | 60 | 2.1 |
| 2 | Cumene hydroperoxide | Cobalt chloride | 3.04 | 1.52 | 20–30 | 25 | 5 | 60 | 0.0 |
| 3 | Benzoyl peroxide | Cobalt chloride | 3.04 | 1.63 | 20–70 | 60 | 5 | 60 | 0.0 |
| 4 | Ammonium persulfate | Sodium sulfite | 3.04 | 1.48 | 35–50 | 40 | 10 | 70 | 2.7 |
| 5 | Ammonium persulfate | Sodium sulfite | 3.04 | 1.48 | 26–47 | 40 | 5 | 90 | 2.4 |
| 6 | Ammonium persulfate | Sodium sulfite | 3.04 | 1.48 | 20–31 | 25 | 5 | 1110 | 2.5 |
| 7[5] | Ammonium persulfate | Sodium thiosulfate | 3.04 | 1.23 | 15–27 | 25 | 5 | 180 | 11.0 |
| 8 | Ammonium persulfate plus 0.34 g of ferrous sulfate | Sodium sulfite | 3.04 | 1.48 | 45–50 | 48 | 5 | 120 | 6.3 |

[1]Catalyst
[2]Accelerator
[3]Average
[4]Time of butadiene addition
[5]Brown Polymer was formed The experiment of Bartl (Example 6) was simulated; it being noted that an exact duplication was impossible since the time of addition of the butadiene was not specified. The reactor was a stirred heavy walled glass autoclave in which the reaction product was visible at all times. Maleic anhydride (245g, 2.5 moles), p-dioxane (250g) and benzoyl peroxide (0.125g) were heated and stirred for 15 minutes at 90°C. A mixture of butadiene (162.5g, 3 moles) p-dioxane (250g) and benzoyl peroxide (2.5g) was passed into the stirred reactor maintained at 90°C at such a rate that the total reactor pressure did not exceed about 20–25 PSIG. The total time of addition of the mixture was 5 hours. It was observed that a homogeneous reaction mixture was present until about 83 percent of the butadiene mixture was added; thereafter, the reactor pressure rose from 20 to 25 PSIG and a separate polymer layer started forming over the body of the reaction mixture. The mixture was stirred and allowed to react for an additional 6 hours at 90°C. Recovered from the reaction mixture was 19.1 g of dry polymeric solid which proved to be polybutadiene and 153.5g of dry polymeric and non-polymeric solids from the remaining homogenous liquids. About 60 percent of the latter was found to be the maleic anhydride-butadiene copolymer. The copolymer composition was close to 1:1 by mole ratio while the excess butadiene homopolymerized and the overall yield of copolymer was about 24 percent of the theoretically possible 1:1 copolymer.

Extended experimentation confirmed the order of magnitude of this yield and also demonstrated that initiating the reaction with another vinyl monomer was completely ineffectual for increasing the yield.

These experiments confirmed the conclusion that the prior art failed to teach how to obtain these copolymers in more than about 25–30 percent yield. It will thus be noted that the present invention is a substantial improvement over the processes of the prior art.

the presence of an excess amount of a sparingly soluble catalyst under conditions where the excess catalyst is left inactive by virtue of being in the solid, crystalline state. This requirement called for a new dimension of selectivity for catalysts or catalyst-accelerator combinations. Selectivity depended not only on operating temperatures and catalyst half-life but also required other considerations. For examples, catalyst solubility in the particular solvent used, reaction mechanism and kinetics of radical generation in a given solvent accelerator solution, and in general the cooperative role of solvent-catalyst-accelerator.

The advantages to be gained by the method of the instant invention are clearly a higher yield of more nearly homogeneous product, easily made without the need for constant catalyst addition or close control of the amount of catalyst used. The method is also useful for selecting catalyst- accelerator combinations. It is believed this method is novel in the art of polymerization and is useful not only in producing high yields of copolymer as will be demonstrated, but is also useful in many other polymerization systems utilizing free-radical initiators. The method is inapplicable and impractical to utilize in those systems which use water solutions or emulsions as the reacting medium and salt-like catalyst components. It is probably for this reason that the instant method has not been previously used. The following is an example of the application of the foregoing method as it applied to catalyst selection. If one considers the class of inorganic persulfates to include ammonium persulfate and the alkali metal persulfates, ammonium persulfate should be far more soluble and useful for a process in aprotic solvents such as ketones, ethers, and esters. This is because of the tendency of ammonium ions to hydrogen-bond with the aprotic solvent. Likewise, in considering accelerators of the class of salts containing sulfur in valency states of four or lower, salts containing the bisulfite, ion, $HSO_3^-$, should be more soluble in ketones because of their tendency to form complexes with ketones.

The set of eleven examples in Table II, hereinbelow out of numerous others, show two outstanding ammonium persulfate-accelerator combination in terms of yield, i.e., $(NH_4)_2S_2O_8$—$NaHSO_3$ and $(NH_4)_2S_2O_8$—$n$—$C_{12}H_{25}SH$.

The examples in Table II were carried out in a manner similar to that used in the examples of Table 1. In each example there was utilized one mole each of maleic anhydride and butadiene.

458g of butadiene in 127 minutes. After a post reaction time of thirty minutes, the temperature was reduced from the 85°C to room temperature and the reaction product was discharged. 367.3g of copolymer (39.4 per cent yield) having an inherent viscosity of 0.38 was recovered.

It will be noted that the yield here, where no activator is used, is considerably lower than in the following five examples wherein sodium bisulfite activator is used.

Utilizing the same general mode of operation as set forth in Example 21 above, Examples 22 through 26

TABLE 2

| Example number | Reaction conditions | | | | Product | | | Catalyst | Accelerator | Amount (g.) | | Solvent | Amt. (g.) |
|---|---|---|---|---|---|---|---|---|---|---|---|---|---|
| | Temp. (°C.) | | Time (min.) | | | | | | | | | | |
| | Range | Avg.[1] | BD addition[2] | Total reaction | Percent yield | IV | Percent gel | | | Cat.[3] | Acc.[4] | | |
| 10 | 25-53 | 50 | 55 | 75 | 29.0 | 1.52 | 0 | $(NH_4)_2S_2O_8$ | $NaHSO_3$ | 3.04 | 1.23 | Acetone | 152 |
| 11 | 50-64 | 53 | 4.5 | 120 | 27.2 | 0.85 | 0 | $(NH_4)_2S_2O_8$ | $NaHSO_3$ | 3.04 | 1.23 | do | 152 |
| 12 | 31-55 | 53 | 3 | 57 | 30.3 | 1.76 | 0 | $(NH_4)_2S_2O_8$ | $NaHSO_3$ | 3.04 | 1.23 | do | 152 |
| 13 | 50-54 | 53 | 50 | 130 | 32.3 | 0.94 | 0 | $(NH_4)_2S_2O_8$ | $NaHSO_3$ | 6.08 | 1.23 | do | 304 |
| 14 | 55-57 | 56 | 96 | 130 | 41.4 | 1.54 | 0 | $(NH_4)_2S_2O_8$ | $NaHSO_3$ | 1.52 | 0.61 | do | 152 |
| 15 | 50-58 | 54 | 90 | 165 | 39.2 | 1.68 | 0 | $(NH_4)_2S_2O_8$ | $NaHSO_3$ | 6.08 | 2.46 | do | 304 |
| 16 | 49-59 | 54 | 72 | 118 | 13.9 | | 0 | $(NH_4)_2S_2O_8$ | $NaHSO_3$ | 3.04 | 1.23 | Tetrahydrofuran. | 152 |
| 17 | 48-64 | 55 | 39 | 50 | 52.5 | 1.83 | 33.3 | $(NH_4)_2S_2O_8$ | $NaHSO_3$ | 3.04 | 1.23 | p-Dioxane | 152 |
| 18 | 53-62 | 60 | 40 | 55 | 0.0 | | 0 | $(NH_4)_2S_2O_8$ | $NaHSO_3$ | 3.04 | 1.23 | Dimethylformamide. | 152 |
| 19 | 52-56 | 55 | 45 | 75 | 36.6 | 0.59 | 0 | $(NH_4)_2S_2O_8$ | n-Dodecyl mercaptan. | 3.04 | 2.34 | Acetone | 152 |
| 20 | 49-55 | 51 | 12 | 60 | 34.0 | 0.49 | 0 | $(NH_4)_2S_2O_8$ | do | 3.04 | 2.37 | do | 152 |

[1] Average. [2] Time of butadiene addition. [3] Catalyst. [4] Accelerator.

It will be understood that the foregoing test results do not represent optimum yields obtainable since these tests were conducted at atmospheric pressure. Optimum yields over 70 percent are attainable at moderate pressure above atmospheric and in a temperature range of 70°-85°C.

Example 21 shows the effect of omitting the accelerator on yield when the operation is conducted near optimum conditions.

EXAMPLE 21

2384g of acetone, 784g of anhydride and 26.6g ammonium persulfate were placed in a 5 liter stirred autoclave. The reactor was purged of air by partial evacuation until the acetone boiled and the reactor was repressured with nitrogen to atmospheric pressure. The temperature of the reactor was brought to 85°C and a steady stream of butadiene was added to introduce were conducted and are set forth in Table 3 hereinbelow. It will be noted that the reaction time and temperature were varied and in turn the yield was affected.

TABLE 3

| | 22 | 23 | 24 | 25 | 26 |
|---|---|---|---|---|---|
| Present in Reactor (g) | | | | | |
| Acetone | 2384 | 1824 | 1824 | 2693 | 2693 |
| Maleic Anhydride | 784 | 392 | 392 | 588 | 588 |
| $(NH_4)_2S_2O_8$ | 26.6 | 24.5 | 20.3 | 81.2 | 81.2 |
| $NaHSO_3$ | 12.2 | 11.2 | 9.3 | 37.2 | 37.2 |
| Added to Reactor | | | | | |
| Butadiene (g) | 454 | 228 | 227 | 341 | 341 |
| Reactor Conditions | | | | | |
| Addition Time (Min.) | 126 | 127 | 127 | 240 | 240 |
| Total Reaction Time (Min.) | 156 | 157 | 157 | 270 | 270 |
| Temperature (°C) | 85 | 85 | 80 | 70 | 70 |
| Product | | | | | |
| Polymer Yield (g) | 755.2 | 385.6 | 380.7 | 680.0 | 682.8 |
| Yield (%) | 61.0 | 62.2 | 61.5 | 73.2 | 73.5 |
| Inherent Viscosity | 0.46 | 0.28 | 0.45 | 0.48 | 0.48 |

To further demonstrate the critical nature of catalyst-accelerator selection, another experiment was conducted identical with Example 25 and 26 wherein the ammonium persulfate was replaced with 96.2g of potassium persulfate. The product yield was not determined precisely but was less than 25 percent and the product had a very dark color.

In Table 4 are shown the results of a controlled series of experiments wherein the amount of catalyst-accelerator added was varied holding the molar ratio of the two with respect to each other constant at 1:1. The conditions for this series were the same as those for Examples 25 and 26 except for the varying amount of catalyst-promoter and temperature as indicated. The "wt percent catalyst" is the combined weight of catalyst-promoter times 100 divided by the combined weight of monomers.

TABLE 4

| Ex. No. | Wt.% Catalyst | Temp(°C) | % Yield | Inherent Viscosity |
|---|---|---|---|---|
| 27 | 0 | 70 | 0.0 | — |
| 28 | 2.96 | 70 | 46.1 | 0.57 |
| 29 | 3.57 | 70 | 58.6 | 0.64 |
| 30 | 3.57 | 70 | 62.6 | 0.43 |
| 31 | 4.45 | 70 | 58.2 | 0.47 |
| 32 | 7.40 | 75 | 66.8 | 0.33 |
| 33 | 7.40 | 75 | 70.0 | 0.38 |
| 34 | 10.37 | 75 | 68.7 | 0.34 |
| 35 | 11.74 | 70 | 73.7 | 0.59 |

From Table 4 it is clear that the yield curve rises rapidly as the weight per cent catalyst is increased from 0 to about four per cent. At higher catalyst concentrations, the yield increases only slightly. The interpretation is that about four wt per cent catalyst is required to maintain the reaction medium nearly saturated throughout the time of reaction. The slight increase with increased catalyst beyond 4 percent is understandable in terms of a dynamic situation, rather than a static equilibrium between solid catalyst and catalyst in solution. Since catalyst is being constantly used up, the rate of solutioning must be proportional to the amount of solid present. Hence the steady state concentration of catalyst in solution must be slightly less than the amount that would be present in static equilibrium and must approach the latter as the amount of undissolved solid catalyst increases.

Also, in Table 4, it is to be noted that product molecular weight as measured by inherent viscosity (IV) remains substantially constant over the whole range of catalyst concentration, the average product IV being somewhat lower at the higher temperature.

The presence of air or oxygen often results in an induction period when ammonium persulfate catalysts are utilized and thus, it is desirable to purge the reactor of air or oxygen prior to initiation of the reaction. The purging can be accomplished by pressure with an inert gas such as nitrogen, followed by bleeding to atmospheric or subatmospheric pressure. Other means of preventing oxygen from interfering with the reaction are well known in the art.

The instant invention provides a simple, economical method of obtaining a high yield in the maleic anhydride-conjugated diene copolymerization. Further, the amount of catalyst need not be as closely controlled as was required in many of the prior polymerization reactions.

Though the invention has been described with respect to certain given embodiments set forth in the examples, it will be understood that this is by way of illustration and not by way of limitation and the scope of the invention is defined solely by the appended claims which should be construed as broadly as is consistent with the prior art.

What is claimed is:

1. In a method of copolymerizing butadiene with maleic anhydride, the improvement comprising the step of reacting the maleic anhydride and butadiene in the presence of an organic solvent selected from the group consisting of acetone and tetrahydrofuran and also in the presence of a catalyst-accelerator combination of substantially equal molar amounts of solid ammonium persulfate and solid sodium bisulfite in an amount of combined weight from 4–7 per cent based on the combined weight of monomers, the amount of solvent being present in a weight ratio to combine monomers in a range of 2:1 to 5:1.

* * * * *